United States Patent [19]

Essary et al.

[11] Patent Number: 5,266,628
[45] Date of Patent: Nov. 30, 1993

[54] WATER BASED COATING COMPOSITION WITH IMPROVED PROCESS RESISTANCE

[75] Inventors: William A. Essary, Saxonburg, Pa.; Michael T. List, Delaware, Ohio

[73] Assignee: PPG Industries, Inc., Pittsburgh, Pa.

[21] Appl. No.: 860,832

[22] Filed: Mar. 31, 1992

[51] Int. Cl.$^5$ ................................................ C08F 8/30
[52] U.S. Cl. .................................... 524/556; 524/560; 524/562; 525/329.9; 525/374
[58] Field of Search ............... 525/374; 524/556, 560, 524/562

[56] References Cited

U.S. PATENT DOCUMENTS

| | | |
|---|---|---|
| 4,076,917 | 2/1978 | Swift et al. |
| 4,101,606 | 7/1978 | Cenci et al. |
| 4,115,637 | 9/1978 | Cenci et al. |
| 4,126,595 | 11/1978 | Martorano et al. |
| 4,138,541 | 2/1979 | Cenci et al. |
| 4,305,859 | 12/1981 | McEwan et al. |
| 4,727,111 | 2/1988 | Pettit, Jr. et al. |
| 5,010,132 | 4/1991 | Morinaga et al. |
| 5,010,149 | 4/1991 | Morita et al. |

OTHER PUBLICATIONS

James Lomax and Graham Swift, "β-Hydroxyalkylamides, Low Polluting Crosslinkers for Carboxyl Containing Polymers", Journal of Coatings Technology, vol. 50, No. 643, Aug. 1978. pp. 49–55.

Primary Examiner—Bernard Lipman
Attorney, Agent, or Firm—Dennis G. Millman

[57] ABSTRACT

A coating composition which may be water based and which is adapted for metallic substrates is disclosed, having: (1) binder resin comprising acrylic polymer having carboxy functionality, and (2) a curing agent comprising hydroxyalkylamide, wherein the ratio of hydroxy groups in the hydroxyalkylamide to carboxy groups in the binder resin is less than 0.5:1, preferably less than 0.4 to 1, and most preferably less than 0.35 to 1. The composition has been found to yield films exhibiting good resistance to water at high temperatures, thereby rendering them particularly suitable for use on metal food and beverage containers that are subjected to sterilization or pasteurization processes.

11 Claims, No Drawings

WATER BASED COATING COMPOSITION WITH IMPROVED PROCESS RESISTANCE

BACKGROUND OF THE INVENTION

This invention is an aqueous coating composition that is well suited for coating metal surfaces and exhibiting water resistance at elevated temperatures. Thus, these compositions are particularly adapted to coating cans that are subjected to high temperature processes during or after filling.

The surfaces of metallic containers intended to contain food or beverages are typically coated so as to retard corrosion of the container and to improve the appearance of the surface. Food and beverage cans are generally made from aluminum, steel, blackplate or tinplate steel. These metal containers are subject to air oxidation and to corrosive action of the food or beverage products, both of which can be accelerated during high temperature pasteurization or sterilization processes associated with some canning operations.

In order to provide high temperature process resistant coatings on cans, the prior art has generally relied on coating compositions that contain substantial amounts of organic solvent. Volatilization of these organic solvents during the curing of these coatings is considered environmentally undesirable, and therefore the art has considered it desirable to find water based coatings with the required degree of high temperature process resistance. Water based coating compositions are generally based on polymeric binders that are either water soluble or dispersions in water. Water dispersions usually entail synthesis by emulsion polymerization using a surfactant. The presence of the surfactant in the film formed from such a coating composition degrades the water resistance of the film. An example of this type of water dispersion composition is disclosed in U.S. Pat. No. 4,305,859 (McEwan et al.). Water soluble binder systems also generally suffer from poor water resistance because of the relatively high carboxy group content needed for water solubility. Such conventional water based coatings typically soften, blister, or blush (get hazy due to water absorption) under process conditions, e.g., 250° F. (121° C.) steam for 30 minutes). The prior art has attempted to improve water resistance of these types of compositions by including substantial amounts of aqueous amino resins such as alkoxy derivatives of melamine or benzoguanamine, but a disadvantage to that approach is typically a loss of film flexibility and the undesirable generation of formaldehyde as a product of the curing reaction. Additionally, the cross-linking stability provided by these amino resins is less than desired under the conditions of high temperature water exposure.

A water based can coating that has high temperature process resistance without relying primarily on melamine or benzoguanamine derivatives or the like would be highly desirable. A high level of process resistance would be indicated by the ability to withstand 250° F. (121° C.) steam for 30 minutes. Superior process resistance would be even more desirable, as evidenced by the ability to withstand 250° F. (121° C.) steam for 90 minutes.

U.S. Pat. No. 4,076,917 (Swift et al.) discloses that hydroxyalkylamides can be used to react with carboxy groups of a waterborne acrylic polymer so as to cure the polymer. The patent discloses that in order to effect a cure, the amount of hydroxyalkylamide used should be chosen relative to the amount of carboxy groups in the acrylic polymer. More specifically the ratio of hydroxy groups in the hydroxyalkylamide to carboxy groups in the polymer are disclosed to be in the range of about 0.5:1 to about 2:1, preferably 1:1. In all of the examples of that patent in which the ratio is disclosed it is 1:1 (or "stoichiometric").

SUMMARY OF THE INVENTION

The present invention is a coating composition which may be water based having: (1) binder resin comprising acrylic polymer having carboxy functionality, and (2) a curing agent comprising hydroxyalkylamide, wherein the ratio of hydroxy groups in the hydroxyalkylamide to carboxy groups in the binder resin is less than 0.5:1, preferably less than 0.4 to 1, and most preferably less than 0.35 to 1. This is less hydroxyalkylamide than was considered necessary by the prior art to cure carboxy functional polymer coatings. Surprisingly, it has now been discovered that coating compositions having such low hydroxyalkylamide levels can yield films having excellent process resistance, i.e., resistance to water at high temperatures. Therefore, the coatings of the present invention are particularly suitable for use on metal food and beverage containers.

DETAILED DESCRIPTION

Hydroxyalkylamide curing agents are disclosed in the aforesaid U.S. Pat. No. 4,076,917 (Swift et al.) and are commercially available from the Rohm and Haas Company, Philadelphia, Pa. They are represented by the following formula:

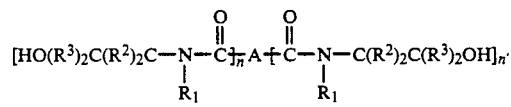

where:

A is a bond, hydrogen or a monovalent or polyvalent organic radical derived from a saturated or unsaturated alkyl radical wherein the alkyl radical contains from 1–60 carbon atoms, such as methyl, ethyl, propyl, butyl, pentyl, hexyl, heptyl, octyl, nonyl, decyl, eicosyl, triacontyl, tetracontyl, pentacontyl, hexyicontyl and the like; aryl, for example, mono- and dinuclear aryl such as phenyl, naphthyl and the like; tri-lower alkyleneamino such as trimethyleneamino, triethyleneamino and the like; or an unsaturated radical containing one or more ethylenic groups such as ethenyl, 1-methylethenyl, 3-butenyl-1,3-diyl, 2-propenyl-1,2-diyl, carboxy lower alkenyl, such as 3-carboxy-2-propenyl and the like, lower alkoxy carbonyl lower alkenyl such as 3-methoxycarbonyl-2-propenyl and the like;

$R^1$ is hydrogen, lower alkyl of from 1–5 carbon atoms such as methyl, ethyl, n-propyl, n-butyl, sec-butyl, tert-butyl, pentyl and the like or hydroxy lower alkyl of from 1–5 carbon atoms such as hydroxyethyl, 3-hydroxypropyl, 2-hydroxypropyl, 4-hydroxybutyl, 3-hydroxybutyl, 2-hydroxy-2-methyl propyl, 5-hydroxypentyl, 4-hydroxypentyl, 3-hydroxypentyl, 2-hydroxypentyl and the isomers of pentyl;

$R^2$ and $R^3$ are the same or different radicals selected from hydrogen, straight or branched chain lower alkyl of from 1–5 carbon atoms or one of the $R^2$ and one of the $R^3$ radicals may be joined to form, together with the carbon atoms, such as cyclopentyl, cyclohexyl and the like;

n is an integer having a value of 1 or 2 and n' is an integer having a value of 0 to 2 or when n' is 0, a polymer or copolymer (i.e., n has a value greater than 1, preferably 2–10) formed from the β-hydroxyalkylamine when A is an unsaturated radical.

Specific examples of hydroxyalkylamides within the formula above that may be used as curing agents are bis[N,N-di(β-hydroxyethyl)] adipamide (available from Rohm and Haas as "QM552"), bis[N,N-di(β-hydroxypropyl)] succinamide, bis[N,N-di(β-hydroxyethyl)] azelamide, bis[N,N-di(β-hydroxypropyl)] adipamide, and bis[N-methyl-N-(β-hydroxyethyl)] oxamide.

An advantage of the hydroxyalkylamide curing agents compared to melamine derivative type curing agents is that in the case of the former, formaldehyde is not formed as a by-product of the crosslinking reaction. Another advantage is that the crosslinking reaction of hydroxyalkylamides with carboxy groups is substantially irreversible at the boiling point of water. Additionally, high temperature process resistance is attained without substantially sacrificing flexibility of the film formed from the coating composition. Although the present invention does not rely on melamine derivatives for curing the coating, small amounts, such as 0.5 to 3 percent, of melamine derivatives may be included in some coating compositions for other purposes such as application improvements. These minor inclusions of melamine derivatives may be tolerated in the coating compositions of the present invention without unduly sacrificing process resistance.

The acrylic polymer which comprises the binder of the coating composition of the present invention may be prepared by free radical addition polymerization of ethylenically unsaturated monomers. A wide range of acrylic monomers known in the art may be used for the polymerization including acrylic acid and/or methacrylic acid and esters thereof. Typical acrylic esters are the lower alkyl esters including methyl (meth)acrylate, ethyl (meth)acrylate, n-butyl (meth)acrylate and isobutyl (meth)acrylate. Other acrylic esters include 2-ethylhexyl (meth)acrylate, dodecyl acrylate. Other carboxy group containing monomers having unsaturation may also be used, including crotonic acid, itaconic acid, fumaric acid, maleic acid, citraconic acid and the like. Inclusion of an acid group containing monomer provides compatibility of the coating composition with water upon neutralization of the polymer with a base such as an amine. Acid groups are also needed for reaction with the hydroxyalkylamide curing agent. To provide for both of these needs, greater than 12 percent by weight on a solids basis of the monomers employed for polymerizing the acrylic polymer should contain acid groups. Preferred embodiments employ 20 to 50 percent acid group containing monomers. The use of more than 65 percent acid containing monomers is not preferred. Expressed differently, sufficient acid functionality is provided in the acrylic polymer to yield an acid value of 1.5 to 9 milliequivalents of KOH per gram of polymer (solids basis). Anhydrides such as maleic anhydride may be used in place of the carboxy group containing monomers, in which case each anhydride will count as an acid functionality of two.

The acrylic polymer may be polymerized entirely from acrylic monomers, but preferred embodiments include vinyl monomers (e.g., styrene or vinyl toluene) copolymerized with the acrylic monomers. Inclusion of vinyl components in the binder polymer has been found to further improve the high temperature water resistance of the coating. To assure sufficient acid group content of the polymer, it would be preferred to include vinyl monomers in amounts less than 85 percent by weight (solids basis) of the monomers used for the preparation of the acrylic polymer.

In addition to the acrylic polymers described above, the binder may include other resins such as polyesters for reducing cost or altering flow characteristics of the composition. However, such additions have generally been found to detract from the process resistance of the coating and therefore are not included in preferred embodiments where the highest level of performance is desired.

Polymerization of the monomers to produce the acrylic polymer generally entails the present of a free radical initiator as known in the art. Free radical initiators include azo compounds such as 2,2'-azobis-(2-methylisobutyronitrile); peroxyesters such as t-butylperoxy acetate, t-butyl peroctoate, t-amyl peroctoate, t-amyl peracetate, and t-butyl perbenzoate; alkylhydroperoxides such as t-butyl hydroperoxide; diacyl peroxides such as dibenzoyl peroxide; and dialkyl peroxides such as ditertiary butyl peroxide and dicumyl peroxide.

Preparation of the acrylic polymer takes place in any suitable organic solvent in which the monomers and the polymer are soluble, as is known in the art. Among the many solvents that may be used are ethers such as 2-ethoxyethanol, 2-butoxyethanol, diethylene glycol monoethyl ether, and 1-methoxy-2-propanol, and alcohols such as butanol, tridecyl alcohol, and mixtures thereof. After the polymerization is concluded, the acid groups on the polymer may be substantially neutralized with a base such as an amine, as is conventional in the art, to render the polymer water soluble. Preferably the base is selected so as to be volatile at the elevated temperature used to cure the coating so that the base does not remain in the cured film. Thereafter, the polymer may be reduced with water, blended with pigments if desired and with the hydroxyalkylamine curing agent and other additives as may be desired for the particular application of the coating composition. For exterior can coatings, including a lubricant such as a wax is often considered desirable, and the wax may be present during the polymerization step.

The relative amounts of hydroxyalkylamide curing agent and acrylic polymer to be blended into the composition is determined by the ratio of hydroxy groups in the curing agent to carboxy groups in the acrylic polymer. For the present invention this ratio is less than 0.5 hydroxy groups to 1 carboxy group, preferably less than 0.4 to 1, and most preferably less than 0.35 to 1. At ratios below 0.02 to 1, there appears to be insufficient crosslinking to provide a durable film. Expressed differently, the amount of hydroxyalkylamide included in preferred embodiments of the invention have generally been in the range of 3 to 10 percent by weight of the total polymer solids of the composition, preferably 3.5 to 8 percent.

Although an important advantage of the present invention is the provision of a water based coating composition, it should be appreciated that the process resistance properties of this composition do not require that the composition be water based. Instead of neutralizing with a base and reducing the composition with water, the neutralizing step may be omitted and the composition may be reduced with an organic solvent or solvent mixture.

Application of the coating onto a substrate may be by any conventional means, but for can coatings roll coating and dip coating are commonly used. Application to can interiors may also be by spraying. Although the coating compositions of the present invention may be applied at any thickness desired, the best process resistance results have been attained at less than 1 mil (0.025 millimeter), preferably less than 0.5 mil (0.013 millimeter), most preferably less than 0.2 mil (0.005 millimeter), dry film thickness. The coating is cured at elevated temperatures at which the hydroxyalkylamide curing agent is activated, usually within the range of 250° F. (125° C.) to 750° F. (400° C.) for a period of time ranging from about 2 seconds to 30 minutes.

It may be noted that good adhesion to metal surfaces under high temperature process conditions was achieved with the present invention without unusual measured being taken to clean or otherwise prepare the surfaces prior to coating. While some prior art compositions may be able to attain adhesion with specially prepared surfaces, the present invention achieves these results with conventional degrees of substrate cleanliness and even relatively poor cleanliness. Therefore, the present invention provides wide latitude in commercial operations, where surface preparation is typically less than ideal.

An aqueous acrylic polymer suitable for use in the coating composition of the present invention was made as described in the following example.

EXAMPLE I

A reaction vessel was charged with butyl Cellosolve® (500 grams), butanol (166 grams), Shellmax® wax (12 grams), and carnauba wax (12 grams), and the contents heated to reflux. A solution of monomers consisting of methyl methacrylate (840 grams), styrene (360 grams), butyl acrylate (720 grams), acrylic acid (480 grams) and tert-dodecyl mercaptan (24 grams) and a solution of catalyst of t-butyl perbenzoate (60 grams) in butyl Cellosolve® (60 grams) were added simultaneously to the reaction mixture over 3 hours. A solution of t-butyl perbenzoate (6 grams) in butanol (6 grams) was then added and the reaction mixture held at reflux for 1.5 hours. The reaction was cooled to less than 130° C. and dimethylethanolamine (475.5 grams) was added. Boiling water (3000 grams) was added slowly over 1.5 hours and the reaction mixture held at 73° C. for 2 hours to yield the acrylic polymer in an aqueous medium.

White coating compositions in accordance with the present invention were formulated and tested as described in the following example.

EXAMPLE II

The acrylic dispersion polymer product of Example I was used to disperse titanium dioxide with a pigment to binder ratio ranging from 1/1 to 1.21/1. This dispersion was blended with bis [N,N-di (β-hydroxyethyl) adipamide at a ratio of hydroxy equivalents to acrylic acid equivalents of 0.24/1. The blended composition was applied to two piece drawn and ironed aluminum and steel cans. The applied film weight ranged from 0.1 mil (0.0025 millimeters) to 0.4 mil (0.01 millimeters) thickness. The cans were cured at temperatures ranging from 330° F. (169° C.) to 450° F. (232° C.) with dwell times ranging from two seconds to 4 minutes. The cured coatings were processed in a steam retort ranging from 15 minutes to 90 minutes at a steam pressure of 15 to 17 pounds per square inch (103 to 117 kilopascals) and a temperature of 250° F. (121° C.) to 254° F. (123° C.). The panels were crosshatched and taped using Scotch 610 tape and evaluated for adhesion failure. No loss of adhesion was found for any of the samples.

The following example describes production of another aqueous acrylic dispersion that may be used in the coating compositions of the present invention.

EXAMPLE III

To a solution of butyl Cellosolve (658 grams) and butanol (260 grams), heated to reflux, was added simultaneously over 3 hours two solutions, the first consisting of styrene (1680 grams) and acrylic acid (720 grams) and the second consisting of t-butyl perbenzoate (84 grams) and butyl cellosolve (60 grams). A solution of t-butyl perbenzoate (6 grams) in butanol (6 grams) was then added and the reaction mixture maintained at reflux for 1.5 hours. After cooling to less than 130° C., dimethylethanolamine (667.4 grams) was added to the reaction mixture. Boiling water (4900 grams) was added over 1.5 hours and the mixture held at 73° C. for 2 hours to give an acrylic polymer in water.

Clear coating compositions within and outside the scope of the present invention were formulated and tested as described in the following example.

EXAMPLE IV

The acrylic dispersion product of Example III was blended with bis [N,N-di(β-hydroxyethyl) adipamide at the ratios of 0, 0.03, 0.14, 0.21, 0.34, 0.44, 0.59 and 0.98 part hydroxy equivalent per one part of carboxy equivalent, applied to tin plated steel drawn and ironed beverage can at about two milligrams per square inch dry. These coated cans were stoved for 90 seconds at 400° F. (204° C.) then again 180 seconds at 400° F. (204° C.). These cans were then partially submerged in water and processed for 90 minutes at 250° F. (121° C.). The cans were scribed and taped with Scotch 610 tape. The results are given in the table below.

| Ratio Hydroxy/carboxy | Appearance Defect | Adhesion Failure (Area) |
| --- | --- | --- |
| 0 | severe blush - blister | 80 |
| .03 | slight - moderate blush | None |
| .14 | moderate blush | None |
| .21 | slight blush | None |
| .34 | very slight blush | None |
| .44 | none | Less than 1% |
| .69 | spot rusting | 1-3% |
| .98 | large spot rusting | 25-30% |

We claim

1. A process resistant, waterborne coating composition for coating metallic containers having:
   (1) binder resin comprising aryclic polymer having carboxy functionality; and
   (2) a curing agent comprising hydroxyalkylamide; wherein the ratio of hydroxy groups in the hydroxyalkylamide to carboxy groups in the binder resin is less than 0.5:1.

2. The coating composition of claim 1 wherein the ratio of hydroxy groups in the hydroxyalkylamide to carboxy groups in the binder resin is less than 0.4:1.

3. The coating composition of claim 1 wherein the ratio of hydroxy groups in the hydroxyalkylamide to carboxy groups in the binder resin is less than 0.35:1.

4. The composition of claim 1 further including solvent, the major portion of which is water.

5. The composition of claim 1 wherein the acrylic polymer has an acid value of 1.5 to 9 milliequivalents of KOH per gram of polymer solids.

6. The composition of claim 1 wherein the acrylic polymer is the reaction product of free radical polymerization of monomers selected from the group consisting of acrylic acid, methacrylic acid, and esters thereof.

7. The composition of claim 6 wherein the acrylic polymer is the product of copolymerization of acrylic monomers with vinyl monomer.

8. The composition of claim 7 wherein the vinyl monomer includes styrene monomer.

9. The composition of claim 1 wherein the hydroxyalkylamide curing agent is selected from the group consisting of bis[N,N-di($\beta$-hydroxyethyl)] adipamide, bis[N,N-di($\beta$-hydroxypropyl)) succinamide, bis[N,N-di($\beta$-hydroxyethyl)] azelamide, bis[N,N-di($\beta$-hydroxypropyl)] adipamide, bis[N-methyl-N-($\beta$-hydroxyethyl)] oxamide and mixtures thereof.

10. The composition of claim 6 wherein acid group containing monomers comprise 12 to 65 percent by weight of the monomers forming the acrylic polymer.

11. The composition of claim 6 wherein acid group containing monomers comprise 20 to 50 percent by weight of the monomers forming the acrylic polymer.

* * * * *